(12) United States Patent
Kim

(10) Patent No.: US 12,251,737 B2
(45) Date of Patent: Mar. 18, 2025

(54) APPARATUS FOR PROTECTING A SENSOR

(71) Applicants: HYUNDAI MOTOR COMPANY, Seoul (KR); KIA CORPORATION, Seoul (KR)

(72) Inventor: Eun Sik Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 274 days.

(21) Appl. No.: 17/683,063

(22) Filed: Feb. 28, 2022

(65) Prior Publication Data

US 2023/0117031 A1 Apr. 20, 2023

(51) Int. Cl.
| | |
|---|---|
| B08B 3/04 | (2006.01) |
| B08B 1/16 | (2024.01) |
| B08B 1/20 | (2024.01) |
| B08B 11/02 | (2006.01) |
| B08B 13/00 | (2006.01) |
| B60Q 9/00 | (2006.01) |
| B60S 1/04 | (2006.01) |
| B60S 1/50 | (2006.01) |
| G01D 11/24 | (2006.01) |

(52) U.S. Cl.
CPC .............. *B08B 3/041* (2013.01); *B08B 1/165* (2024.01); *B08B 1/20* (2024.01); *B08B 11/02* (2013.01); *B08B 13/00* (2013.01); *B60S 1/0494* (2013.01); *B60S 1/50* (2013.01); *G01D 11/245* (2013.01); *B60Q 9/00* (2013.01)

(58) Field of Classification Search
CPC ................................... B08B 3/041; B60S 1/56
See application file for complete search history.

(56) References Cited

U.S. PATENT DOCUMENTS

| | | | |
|---|---|---|---|
| 2019/0162953 A1* | 5/2019 | Bretagnol | .............. B08B 17/06 |
| 2020/0108797 A1 | 4/2020 | Nam et al. | |
| 2020/0180569 A1 | 6/2020 | Seo | |

FOREIGN PATENT DOCUMENTS

| | | |
|---|---|---|
| KR | 20200040013 A | 4/2020 |
| KR | 20200070907 A | 6/2020 |

\* cited by examiner

*Primary Examiner* — Andrew A Horton
(74) *Attorney, Agent, or Firm* — Lempia Summerfield Katz LLC

(57) ABSTRACT

An apparatus for protecting a sensor includes: a housing accommodating the sensor to allow a sensing plane of the sensor to be exposed, and mounted on an installation object, a protective film disposed to face a sensing plane of the sensor, and a moving unit installed in the housing and moving the protective film while the protective film is maintained with respect to the sensing plane of the sensor.

18 Claims, 10 Drawing Sheets

APPARATUS FOR PROTECTING A SENSOR

CROSS-REFERENCE TO RELATED APPLICATION(S)

This application claims the benefit of and priority to Korean Patent Application No. 10-2021-0140415 filed on Oct. 20, 2021 in the Korean Intellectual Property Office, the entire contents of which are incorporated herein by reference.

TECHNICAL FIELD

The present disclosure relates to an apparatus for protecting a sensor which may prevent foreign objects from being directly attached to a sensing plane of the sensor and may also maintain the sensing plane to be clean such that the sensor may sense accurately.

BACKGROUND

The statements in this section merely provide background information related to the present disclosure and may not constitute prior art.

For example, an autonomous vehicle may include a large number of sensors such as a lidar, a radar, and a camera to perform safe autonomous driving. However, when such sensors are contaminated by foreign objects, accurate sensing may be impossible.

To address such a contamination issue, a technique of installing a pump and a wiper around a sensor of a vehicle and wiping out foreign substances by spraying air or water, or a technique of shaking foreign objects off by rotating a protective cover of a sensor has been suggested.

In the case of the technique of wiping out by spraying air or water, however, the configuration may be complicated, a layout in a vehicle may increase, and the technique may be expensive such that marketability may be degraded. Also, in the case of using the technique of rotating the protective cover, it may be difficult to properly remove foreign objects having high viscosity.

The above descriptions regarding background technologies have been made only for enhancement of understanding of the background of the present disclosure, and are not to be deemed by those having ordinary skill in the art to correspond to already-know prior arts, and should not be taken as acknowledgment that this information forms any part of prior art.

SUMMARY

The present disclosure provides an apparatus for protecting a sensor. The apparatus may prevent foreign objects from being directly attached to a sensing plane of the sensor and may also maintain the sensing plane to be clean, such that the sensor may sense accurately.

According to an aspect of the present disclosure, an apparatus for protecting a sensor includes: a housing accommodating the sensor to allow a sensing plane of the sensor to be exposed, and mounted on an installation object, a protective film disposed to correspond to a sensing plane of the sensor, and a moving unit installed in the housing and moving the protective film while the protective film is maintained with respect to the sensing plane of the sensor.

The protective film may be formed of a transparent material such that the sensor may be able to perform sensing while the sensing plane of the sensor is covered.

The protective film may have a band shape to be wound, and the moving unit may include a first roller mounted while the protective film is wound, and installed in the housing, a second roller spaced apart from the first roller, disposed in the housing, and winding the protective film unwound from the first roller, and a driving unit configured to generate driving force for rotating the second roller.

The protective film may be provided in the form of a cartridge such that a first end of the protective film may be fixed to a first bobbin and the protective film may be wound on the first bobbin, and a second end of the protective film may be fixed to a second bobbin, the first bobbin may be installed to be fitted to the first roller to rotate with the first roller, and the second bobbin may be installed to be fitted to the second roller to rotate with the second roller.

The housing may be configured to be divided into a first housing unit and a second housing unit, and the protective film in the form of the cartridge may be separated from the housing and may be replaceable.

In one f the apparatus may include a rotation prevention means configured to prevent rotation of the first roller.

The rotation prevention means may include a spring.

The driving force, which is applied by the driving unit and rotates the second roller, may be determined to exceed rotation preventing force of the rotation prevention means.

In another form, the apparatus may include a control unit electrically connected to the driving unit and configured to control the driving unit, wherein the control unit is electrically connected to the sensor.

The control unit may sense transparency of the protective film by the sensor and control operation of the driving unit according to a result of the sensing.

In another form, the apparatus may include a transparency sensor disposed in the housing and configured to sense transparency of the protective film, wherein the control unit may be electrically connected to the transparency sensor.

In another form, the apparatus may include a thickness sensor disposed in the housing and configured to sense a thickness of the protective film wound on the second roller, wherein the control unit may be electrically connected to the thickness sensor and a warning unit.

The control unit may include a timer or may be electrically connected to the timer.

In another form, the apparatus may include a cleaning liquid tank supported by the housing and accommodating the second roller and a cleaning liquid, wherein, in the cleaning liquid tank, the second roller may be immersed in the cleaning liquid and may be rotatable.

A through-hole for supporting a rotation shaft of the second roller to rotate may be formed in the cleaning liquid tank, and the driving unit may be installed externally of the cleaning liquid tank and may be connected to the second roller through the through-hole.

The protective film may have a first end fixed to the first roller and may be wound on or unwound from the first roller, and the protective film may have a second end fixed to the second roller and may be wound on or unwound from the second roller, and the driving unit may be able to perform forward and reverse rotation.

When the second roller rotates in a forward direction by the driving unit, the protective film unwound from the first roller may be wound on an outer circumferential surface of the second roller and may be immersed in the cleaning liquid in the cleaning liquid tank. When the second roller rotates in a reverse direction by the driving unit, the protective film unwound from the second roller may be wound on an outer circumferential surface of the first roller, and a washed portion of the protective film may be disposed to correspond to the sensing plane of the sensor.

In another form, the apparatus may include a guide member installed in an opening of the installation object, pressing the protective film to be bent, and removing foreign objects when the protective film moves.

The guide member may have a polygonal cross-sectional surface.

BRIEF DESCRIPTION OF DRAWINGS

The above and other aspects, features, and advantages of the present disclosure should be more clearly understood from the following detailed description, taken in conjunction with the accompanying lead-outs, in which.

Figure 1:
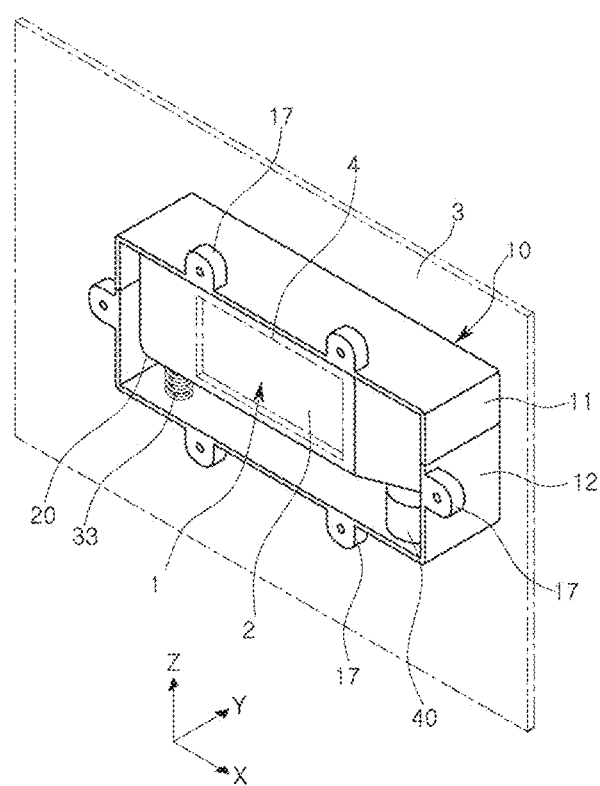
FIG. 1 is a perspective diagram illustrating an installation state of an apparatus for protecting a sensor according to a first example embodiment of the present disclosure.

The drawings described herein are for illustration purposes only and are not intended to limit the scope of the present disclosure in any way.

DETAILED DESCRIPTION

In the description below, embodiments of the present disclosure are described as follows with reference to the attached drawings.

In the drawings, the same elements are indicated by the same reference numerals.

Terms such as "first" and "second" may be used in describing various elements, but the above elements shall not be restricted to the above terms. The above terms are used only to distinguish one element from the other.

As publicly known in the art, some of exemplary forms may be illustrated in the accompanying drawings from the viewpoint of function blocks, units and/or modules. Those having ordinary skill in the art should understand that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in the present disclosure.

When a component, device, element, or the like of the present disclosure is described as having a purpose or performing an operation, function, or the like, the component, device, or element should be considered herein as being "configured to" meet that purpose or to perform that operation or function.

In example embodiments, the apparatus for protecting a sensor may be installed in, for example, a vehicle, for ease of description, but an example embodiment thereof is not limited thereto.

Also, the terms "up and down," "upper," "lower," and "left and right" used in relation to the direction are defined based on a vehicle body, that is, an installation object.

Figure 2:
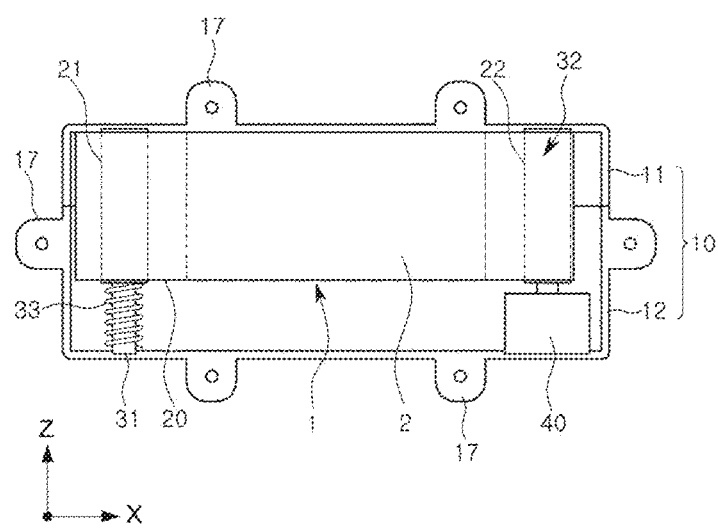
FIG. 2 is a front diagram illustrating an apparatus for protecting a sensor according to a first example embodiment of the present disclosure.
Figure 3:
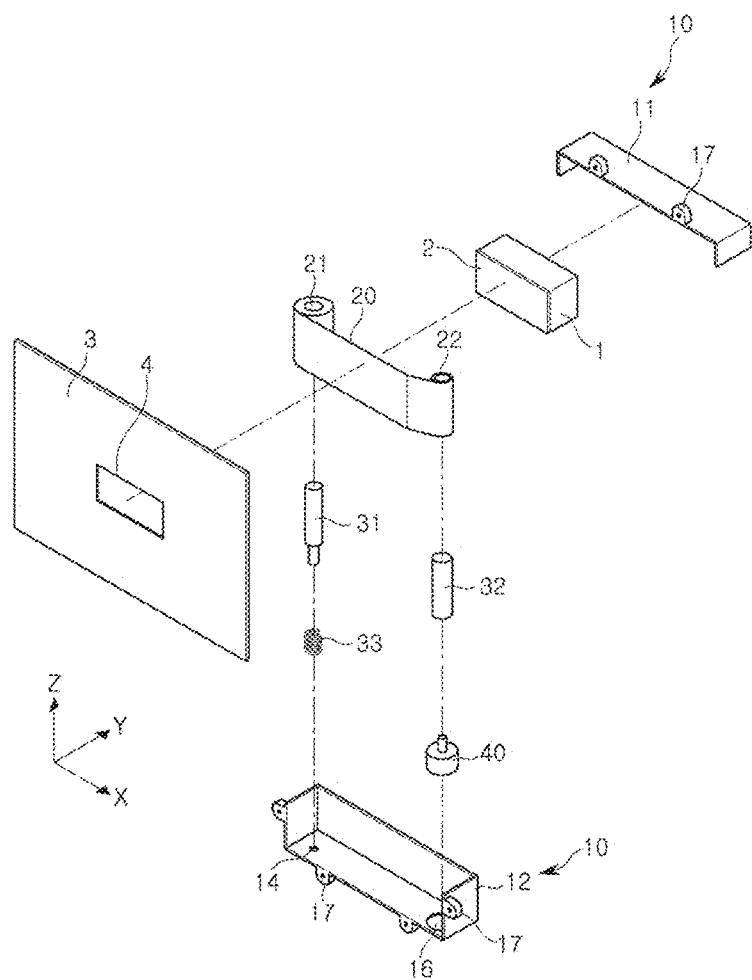
FIG. 3 is an exploded perspective diagram illustrating an apparatus for protecting a sensor according to a first example embodiment of the present disclosure.
Figure 4:
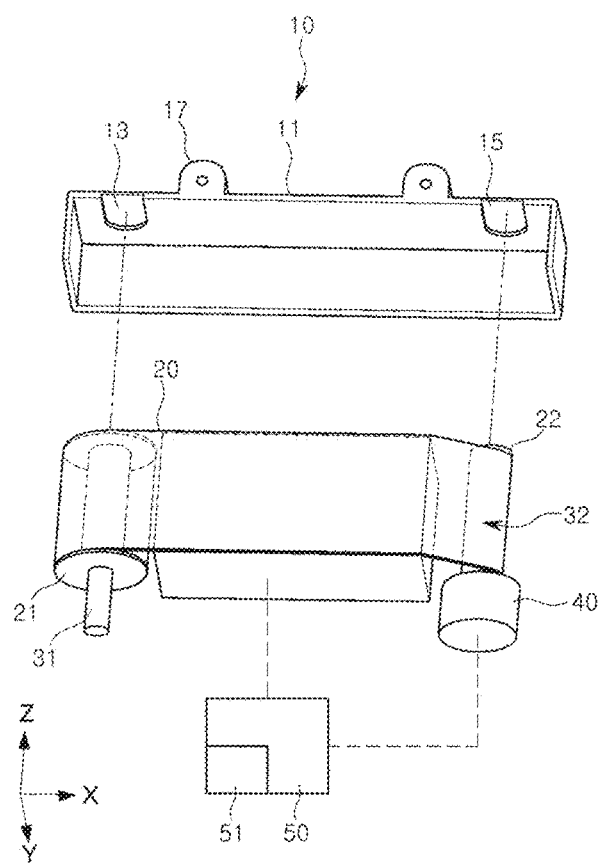
FIG. 4 is a perspective diagram illustrating an apparatus for protecting a sensor according to a first example embodiment of the present disclosure, while a second housing unit is omitted.

FIG. 1 is a perspective diagram illustrating an installation state of an apparatus for protecting a sensor according to a first example embodiment. FIG. 2 is a front diagram illustrating an apparatus for protecting a sensor according to a first example embodiment. FIG. 3 is an exploded perspective diagram illustrating an apparatus for protecting a sensor according to a first example embodiment. FIG. 4 is a perspective diagram illustrating an apparatus for protecting a sensor according to a first example embodiment, while a second housing unit is omitted.

The apparatus for protecting a sensor according to the first example embodiment may include a housing 10, a protective film 20, and a moving unit.

The housing 10 may be a box-shaped member, and one side surface disposed in a side direction may be configured as an open surface, for example. The housing may be fixed to an installation object 3.

The installation object 3 may be implemented as, for example, a vehicle body, and the installation object may have an opening 4 which may allow an arbitrary sensor 1 in the installation object to sense desired external information. Accordingly, the housing 10 may be disposed such that the open surface corresponds to the opening of the installation object.

The housing 10 may be coupled to the installation object 3 by a fastener 5 (see FIG. 6), such as a screw. To this end, the housing may include protrusions 17 having holes on upper, lower, left and right ends of the open surface, respectively.

In another form, the housing 10 may be configured to be divided into a first housing unit 11 and a second housing unit 12. When the housing is divided into the first housing unit and the second housing unit, the open surface may also be divided into two regions. For example, the first housing unit and the second housing unit may be vertically separated from each other.

The housing 10 may accommodate the components of the apparatus for protecting a sensor described below together with the sensor 1 therein. The sensor may be connected to a power source outside of the housing by a wire (not illustrated) or may be connected to a battery disposed in the housing and may be supplied with power.

The protective film 20 may be formed of a transparent material such that the sensing may be performed while a sensing plane 2 of the sensor 1 is covered, and the protective film 20 may have an elongated band shape to be wound. A width (length in the Z direction in FIGS. 1, 2 and 4) of the protective film may be formed to have a size of several to several tens of centimeters sufficient to cover the sensing plane.

In one form, the protective film 20 may be formed of a transparent synthetic resin such as, for example, polyethylene terephthalate (PET), polyethylene (PE), polyurethane (PU), and the like.

When the apparatus for protecting a sensor according to the first example embodiment is applied to protect an image sensor such as a camera, for example, the protective film 20 may be formed of a transparent material.

Here, transparency in the example embodiment may indicate that, in addition to transmission of light such as visible light, infrared light, laser, or the like, electromagnetic waves required for sensing may also pass through without reflection or scattering.

In the apparatus for protecting a sensor according to the first example embodiment, the protective film 20 may be configured in the form of a cartridge such that a first end in the length direction thereof may be fixed to a first bobbin 21 and may be wound on the first bobbin, and a second end thereof may be fixed to a second bobbin 22.

In this case, the first bobbin 21 may be fitted to a first roller 31 described below and may be installed to rotate together with the first roller, and the second bobbin 22 may be fitted to a second roller 32 described below and may be installed to rotate together with the second roller.

In order to couple the bobbin to the roller to rotate together without relative rotation with each other, a groove or a protrusion may be formed in the bobbin and a protrusion or a groove may be formed in the corresponding roller. However, in the apparatus for protecting a sensor according to the first example embodiment, the coupling means between the bobbin and the roller is not limited to any particular example.

The protective film 20 in the form of a cartridge may be easily inserted into and easily withdrawn from the housing 10, particularly when the housing is configured to be divided into the first housing unit 11 and the second housing unit 12.

The moving unit may be installed in the housing 10 and may move the protective film while the protective film 20 is maintained with respect to the sensing plane 2 of the sensor 1. The moving unit may include a first roller 31, a second roller 32, and a driving unit 40.

The first roller 31 may be mounted while the protective film 20 is wound, and may be a member for unwinding the protective film. That is, the protective film before being used may be installed in a wound state on the outer circumferential surface of the first roller, and as the first roller rotates, a portion of the protective film may be released from the first roller.

For the installation of the first roller 31, a seating groove for holding and supporting the rotation shaft of the first roller may be formed on the upper internal surface and the lower internal surface of the housing 10. For example, when the housing is configured to be divided into the first housing unit 11 and the second housing unit 12, a first seating groove 13 may be formed on an internal surface of one side of the first housing unit as illustrated in FIG. 4, and the second seating groove 14 may be formed on an internal surface of one side of the second housing unit as illustrated in FIG. 3.

The apparatus for protecting a sensor according to the first example embodiment may further include a rotation prevention means 33 for preventing rotation of the first roller 31 when no external force is applied.

In one form, the rotation prevention means 33 may include a spring, for example, a torsion spring or a spiral spring. One end of the spring may be caught by and fixed to the first roller 31, and the other end may be caught by and fixed to the housing 10.

The rotation prevention means 33 may prevent the first roller 31 from rotating by the elastic force of the spring when no external force is applied. Accordingly, the protective film 20 may be maintained at constant tension by the rotation prevention means.

The second roller 32 may be spaced apart from the first roller 31 in the housing 10 and may be disposed parallel to the first roller. The second roller 32 may be a member for winding the protective film 20 unwound from the first roller. For example, the first roller and the second roller may be spaced apart from each other by a predetermined distance in the horizontal direction (X direction in FIGS. 1, 2, and 4) in the housing.

The second roller 32 may be configured to rotate by the driving force of the driving unit 40, and the second roller may wind the protective film 20 unwound from the first roller 31 on the outer circumferential surface thereof. For winding the second roller, the second end of the protective film may be coupled so as not to rotate relative to the second roller via the second bobbin 22.

For the installation of the second roller 32, the upper internal surface of the housing 10 may include a roller seating groove 15 for holding and supporting the rotation shaft of the second roller. A driving-unit seating groove 16 for seating the driving unit 40 rotating the second roller may be formed on the lower internal surface of the housing.

For example, when the housing 10 is configured to be divided into the first housing unit 11 and the second housing unit 12, a roller seating groove 16 may be formed on an internal surface of one side of the first housing unit as illustrated in FIG. 4. A driving-unit seating groove 15 may be formed on an internal surface of one side of the second housing unit as illustrated in FIG. 3.

In one form, the driving unit 40 may include a motor or actuator, which is able to rotate the second roller 32 at a predetermined angle, such as a step motor. The driving unit may be directly connected to the rotation shaft of the second roller or may further include a transmission means such as a gear and may be indirectly connected to the rotation shaft of the second roller.

Here, the driving unit 40 may not only be installed in the second roller 32, and if desired, selectively, a driving unit may be provided in the first roller 31 and may rotate the first roller. In this case, the driving unit of the first roller may also work as the rotation prevention means 33.

Also, the driving force applied by the driving unit 40 to rotate the second roller 32 may be configured to exceed the rotation preventing force by force of the rotation prevention means 33 of the first roller 31, that is, the elastic force of the spring. Accordingly, when the second roller rotates by the driving unit, the first roller 31, connected by the protective film 20, may also rotate.

The driving unit 40 may be supplied with power by being connected to a power source outside the housing 10 by a wire (not illustrated) or by being connected to a battery disposed in the housing.

In the apparatus for protecting a sensor according to the first example embodiment, because the second roller 32 is spaced apart from the first roller 31, the protective film 20 may be exposed by a spacing between the first roller and the second roller.

Further, when the opening 4 is formed in the installation object 3, at least a portion of the exposed surface of the protective film 20 may be exposed toward the outside of the installation object. In other words, the exposed surface of the protective film may be disposed between the sensing plane 2 of the sensor 1 and the opening of the installation object.

The housing 10 may be firmly fixed to the installation object 3 by a fastener 5, and simultaneously, the sensor 1 may be supported by the internal surface of the housing. In particular, the protective film 20 may always be maintained with constant tension between the first roller 31 and the second roller 32 by the rotation prevention means 33, such that the exposed surface of the protective film may be flatly and securely in close contact with the sensor.

Accordingly, foreign objects may be prevented from entering between the exposed surface of the protective film 20 and the sensor 1.

When the exposed surface of the protective film 20 is contaminated by foreign objects, by rotating the second roller 32 by the driving unit 40, a clean portion of the protective film may be released from the wound first roller 31 and may be disposed over the sensing plane 2 of the sensor 1, and a contaminated portion may be wound on the outer circumferential surface of the second roller.

Because the protective film 20 in the form of a cartridge may be easily withdrawn from the housing 10, the cartridge of the used protective film may be separated from the housing and may be removed.

The apparatus for protecting a sensor according to the first example embodiment may further include a control unit 50 for controlling the driving unit 40. The control unit may be electrically connected to the driving unit and may communicate with the driving unit by a wired, wireless, or wired/wireless manner.

The control unit 50 may rotate the second roller 32 by operating the driving unit 40 every time the protective film 20 reaches a certain period (1 to 6 months) or a certain condition (when transparency deteriorates), thereby controlling the protective film having a clean surface to be unwound from the first roller 31.

In one form, the control unit 50 may include a timer 51 or may be electrically connected to the timer. Accordingly, when it is determined that a predetermined movement period has been reached, the control unit may control the operation of the driving unit 40. For example, the control unit 50 may be electrically connected to the sensor 1 and the driving unit 40. Accordingly, when foreign objects are attached to the protective film 20, the control unit may recognize abnormality of the sensor. For example, when the sensor is a camera, the control unit may analyze the image, may sense the transparency of the protective film and may also simultaneously measure the degree of contamination, and may control the operation of the driving unit according to the result of the measurement.

Alternatively, the apparatus for protecting a sensor according to the first example embodiment may include a transparency sensor (not illustrated) disposed in the housing 10 and configured to sense transparency of the protection film 20, and the control unit 50 may be electrically connected to the transparency sensor and the driving unit 40.

As the transparency sensor, for example, an optical sensor, such as an infrared sensor, or a rain sensor may be employed. Substantially, the transparency sensor may sense the transparency of the protective film 20, and when it is determined that the transparency of the protective film deteriorates more than a reference value by a signal from the transparency sensor, the control unit 50 may control the operation of the driving unit 40.

Accordingly, a clean portion of the protective film 20 may be automatically placed on the sensing plane 2 of the sensor 1.

Also, the apparatus for protecting a sensor according to the first example embodiment may include a thickness sensor 52 (see FIG. 5) disposed in the housing 10 and sensing a thickness of the protective film 20 wound on the second roller 32, and the control unit may be electrically connected to the thickness sensor and a warning unit (not illustrated).

As the thickness sensor 52, for example, a contact sensor, a non-contact distance sensor, a proximity sensor, or the like, may be employed. Substantially, the thickness sensor may sense the thickness of the protective film 20 wound on the second roller 32 after being used, and when it is determined that the protective film is wound to a limit by a signal from the thickness sensor, the control unit 50 may operate the warning unit to warn a user of the installation object 3 visually or audibly that the cartridge replacement time has arrived.

Alternatively, when the control unit 50 determines that a predetermined replacement period has been reached by the timer 51, the control unit 50 may operate the warning unit to visually or audibly warn the user of the installation object 3 that the cartridge replacement time has arrived.

Accordingly, the user may replace the cartridge of the protective film 20 at an appropriate time.

When the apparatus for protecting a sensor in the example embodiment is applied to a vehicle, the control unit 50 may be incorporated into or used in combination with an electronic control unit (ECU) of a vehicle, for example.

Figure 5:
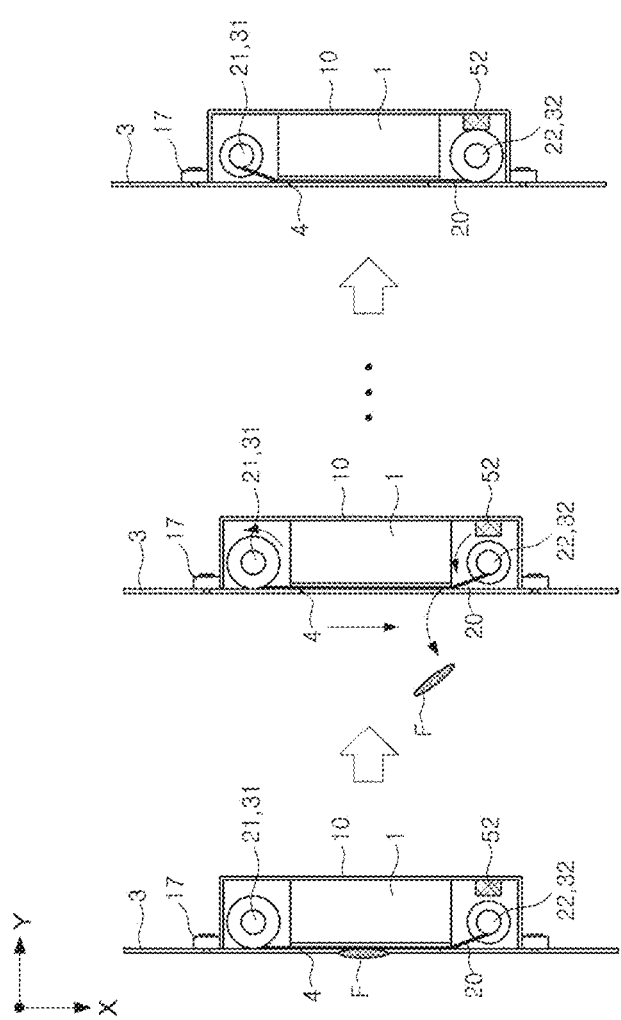
FIG. 5 is a diagram illustrating an operational state of an apparatus for protecting a sensor according to a first example embodiment of the present disclosure.

FIG. 5 is a diagram illustrating an operational state of an apparatus for protecting a sensor according to a first example embodiment. FIG. 5 is a plan view in which a first housing unit is omitted.

When the foreign object F is attached to the protective film, as described above, the control unit 50 may recognize sensing abnormality of the sensor 1, or when the sensor is a camera, the control unit 50 may analyzes the image, may sense the transparency of the protective film and may simultaneously measure the degree of contamination, and may control the operation of the driving unit 40.

Alternatively, the transparency sensor may sense the transparency of the protective film 20, and when it is determined that the transparency of the protective film deteriorates more than a reference value by a signal from the transparency sensor, the control unit 50 may control the operation of the driving unit 40.

The second roller 32 may rotate by the driving force of the driving unit 40, and the first roller 31 connected by the protective film 20 may also rotate. The second roller may wind the protective film unwound from the first roller on the outer circumferential surface thereof according to the rotation thereof.

In this case, the foreign object F may also move together according to the movement of the protective film 20, and the foreign object may gradually approach an edge of one side forming the opening 4 of the installation object 3. The foreign object may be removed from the protective film by the relatively sharp edge of the opening.

Although the foreign object F is removed from the protective film 20, traces or still contaminated portions may be wound on the outer circumferential surface of the second roller 32. As the winding of the protective film continues, a clean portion of the protective film may be released from the wound first roller 31, may spread to correspond to the sensing plane 2 of the sensor 1 and may form the exposed surface.

Accordingly, the sensor 1 may continuously perform accurate sensing through the protective film 20.

The above process may be repeated several times, and the thickness sensor 52 may sense the thickness of the protective film 20 wound on the second roller 32 after being used, and when it is determined that the protective film is wound by a limit by a signal from the thickness sensor, the control unit 50 may operate the warning unit to warn the user of the installation object 3 visually or audibly that the cartridge replacement time has arrived.

Alternatively, when the control unit 50 determines that a predetermined replacement period has been reached by the timer 51, the control unit 50 may operate the warning unit to visually or audibly warn the user of the installation object 3 that the cartridge replacement time has arrived.

Accordingly, the user may exchange the cartridge of the protective film 20 in the protective device for the sensor according to the first example embodiment at an appropriate time.

Figure 6:
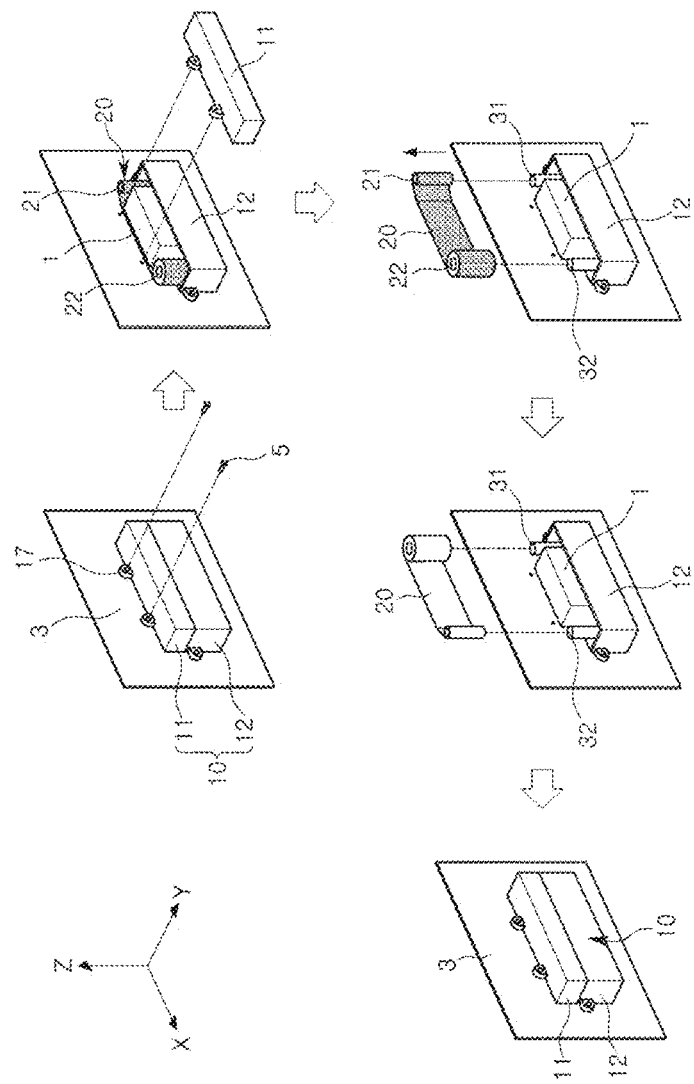
FIG. 6 is a diagram illustrating a method of changing a cartridge of an apparatus for protecting a sensor according to a first example embodiment of the present disclosure.

FIG. 6 is a diagram illustrating a method of changing a cartridge of an apparatus for protecting a sensor according to a first example embodiment.

While the apparatus for protecting a sensor according to the first example embodiment is mounted on the installation object 3, at least a portion of the housing 10 may be removed from the rear surface of the installation object.

For example, when the housing 10 is configured to be divided into the first housing unit 11 and the second housing unit 12, the fastener 5 fastened to the protrusion 17 of the first housing unit may be released, such that the first housing unit may be separated from the installation object 3.

Thereafter, the cartridge of the used protective film 20 may be removed. By releasing the coupling between the bobbin and the roller of the protective film, the protective film may be easily separated from the first roller 31 and the second roller 32.

A cartridge of a new protective film 20 may be prepared, and a bobbin of the new protective film may be coupled to the roller, such that the cartridge of the new protective film may be mounted in the housing 10, at least in the second housing unit 12. In this case, the bobbin may be coupled to not rotate relative to the corresponding roller.

Finally, by coupling the separated first housing unit 11 to the rear surface of the installation object 3 by means of the fastener 5, replacement of the cartridge in the apparatus for protecting a sensor according to the first example embodiment may be completed.

As described above, since the protection device for a sensor according to the first example embodiment is configured to allow replacement of the cartridge by removing the first housing, the sensor and the components may be protected, and the used protective film may be easily replaced with a new protective film.

According to the protection device for a sensor according to the first example embodiment, the sensor may be protected, and foreign objects may be prevented from adhering to the sensing plane of the sensor, and the sensor may continuously and accurately sense through the protection film.

Also, according to the apparatus for protecting a sensor according to the first example embodiment, a pump for spraying air or water, a connection pipe, a wiper for wiping, and the like, may not be used such that the apparatus may be configured compactly. Accordingly, there may be an effect in which costs may be reduced, and that the space required for the installation object such as a vehicle may be significantly reduced.

Also, according to the apparatus for protecting a sensor according to the first example embodiment, using a cartridge replacement method, contamination of the sensor and also the installation object and the environment may be prevented, and even when contamination by foreign objects occurs, the sensing may be resumed by simply replacing the protective film.

Figure 7:
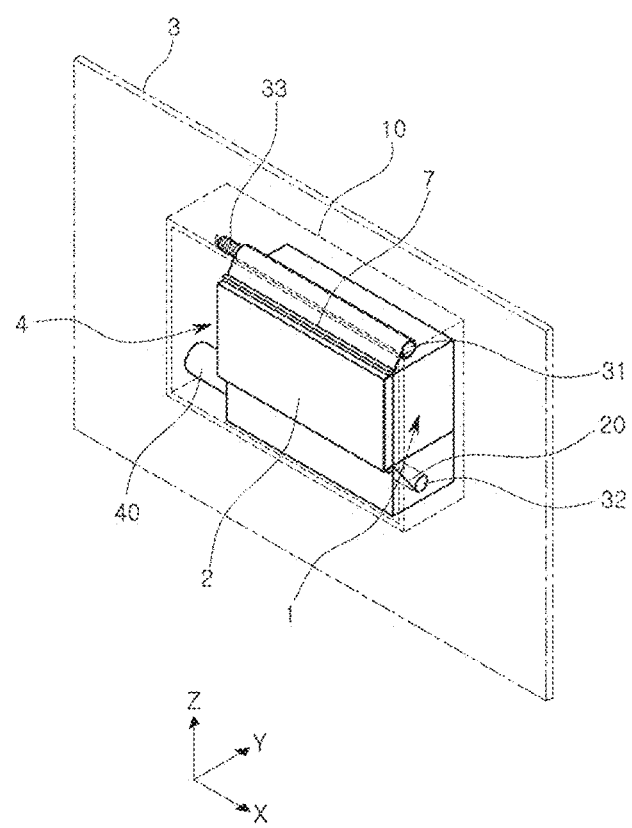
FIG. 7 is a perspective diagram illustrating an installation state of an apparatus for protecting a sensor according to a second example embodiment of the present disclosure.
Figure 8:
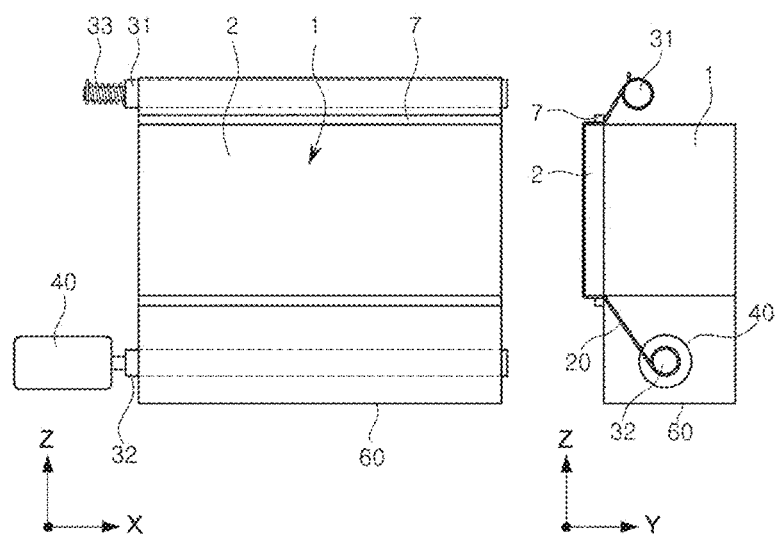
FIG. 8 is diagrams illustrating an apparatus for protecting a sensor according to a second example embodiment of the present disclosure, while a housing is omitted.
Figure 9:
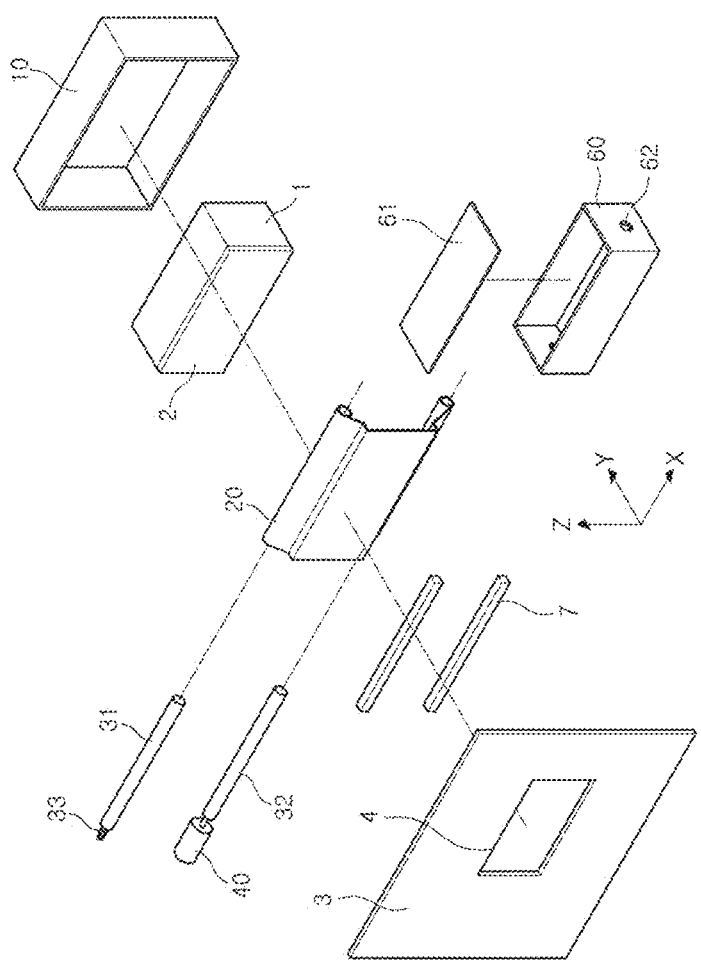
FIG. 9 is an exploded perspective diagram illustrating an apparatus for protecting a sensor according to a second example embodiment of the present disclosure.

FIG. 7 is a perspective diagram illustrating an installation state of an apparatus for protecting a sensor according to a second example embodiment. FIG. 8 is diagrams illustrating an apparatus for protecting a sensor according to a second example embodiment, while a housing is omitted. FIG. 9 is an exploded perspective diagram illustrating an apparatus for protecting a sensor according to a second example embodiment.

The apparatus for protecting a sensor according to the second example embodiment may include a housing 10, a protection film 20, a moving unit, and a cleaning liquid tank 60.

The housing 10 may be a box-shaped member, and one side surface disposed in a side direction may be configured as an open surface, for example. The housing may be fixed to an installation object 3.

The installation object 3 may be implemented as, for example, a vehicle body, and the installation object may have an opening 4 which may allow an arbitrary sensor 1 in the installation object to sense desired external information. Accordingly, the housing 10 may be disposed such that the open surface corresponds to the opening of the installation object.

The housing 10 may be coupled to the installation object 3 by a fastener 5 (see FIG. 6), such as screws. To this end, the housing may be formed with protrusions 17 (see FIGS. 1 to 6) having holes on upper, lower, left and right ends of the open surface, respectively.

The housing 10 may accommodate the components of the apparatus for protecting a sensor described below together with the sensor 1 therein. The sensor may be connected to a power source outside the housing by a wire (not illustrated) or may be connected to a battery disposed in the housing and may be supplied with power.

The apparatus for protecting a sensor according to the second example embodiment may further include a guide member 7 installed in the opening 4 of the installation object 3, pressing the protective film 20 to be bent, and improving the efficiency of removing foreign objects when the protective film moves.

The guide member 7 may be formed of a material such as plastic, for example, and may be formed in a rod shape having a polygonal cross-sectional surface, such as triangular or quadrangular shape.

The protective film 20 may be formed of a transparent material such that sensing may be performed while the sensing plane 2 of the sensor 1 is covered, and may be formed in an elongated band shape to be able to be wound. The width (length in the X direction in FIGS. 7 and 8) of the protective film may be configured to have a size of several to several tens of centimeters sufficient to cover the sensing plane.

Also, the protective film 20 may be formed of, for example, a transparent synthetic resin such as polyethylene terephthalate (PET), polyethylene (PE), polyurethane (PU), and the like.

When the apparatus for protecting a sensor according to the second example embodiment is applied to protect an image sensor such as a camera, for example, the protective film 20 may be formed of a transparent material.

Here, transparency in the example embodiment may indicate that, in addition to transmission of light such as visible light, infrared light, laser, or the like, electromagnetic waves required for sensing may also pass through without reflection or scattering.

In the apparatus for protecting a sensor according to the second example embodiment, a first end of the protective film 20 in the length direction may be directly fixed to a first roller 31 described below and may be wound on or unwound from the first roller 31, and a second end may be directly fixed to a second roller 32 described below and may be wound on or unwound from the second roller.

To couple the end of the protective film 20 to the roller to rotate together without relatively rotating from each other, a slit may be formed in the roller and the end may be inserted into the slit, or the end may be bonded to the roller. However, in the apparatus for protecting a sensor according to the second example embodiment, the coupling means between the end of the protective film and the roller is not limited to any particular example.

The moving unit may be installed in the housing 10, and may move the protective film while maintaining the protective film 20 with respect to the sensing plane 2 of the sensor 1. The moving unit may include a first roller 31, a second roller 32, and a driving unit 40.

The first roller 31 may be mounted while the protective film 20 is wound, and the first roller 31 may be a member for unwinding the protective film. That is, the protective film before being used may be installed while being wound on the outer circumferential surface of the first roller, and as the first roller rotates, a portion of the protective film may be released from the first roller.

For the installation of the first roller 31, a support bracket (not illustrated) for supporting the rotation shaft of the first roller to rotate may be formed on the internal surface of the housing 10 and may be integrated with the housing.

Alternatively, for installation of the first roller 31, a through-hole (not illustrated) for supporting the rotation shaft of the first roller to rotate may be formed on both left and right side surfaces of the housing 10.

The apparatus for protecting a sensor according to the second example embodiment may further include a rotation prevention means 33 for preventing the rotation of the first roller 31 when no external force is applied.

In one form, the rotation prevention means 33 may include a spring, for example, a torsion spring or a spiral spring. One end of the spring may be caught by and fixed to the first roller 31, and the other end may be caught by and fixed to the housing 10.

The rotation prevention means 33 may prevent the first roller 31 from rotating by the elastic force of the spring when no external force is applied. Accordingly, the protective film 20 may be maintained at constant tension by the rotation prevention means.

The second roller 32 may be spaced apart from the first roller 31 in the housing 10 and may be disposed parallel to the first roller, and the second roller 32 may be a member for winding and unwinding the protective film 20 unwound from the first roller. For example, the first roller and the second roller may be spaced apart from each other by a predetermined distance in the vertical direction (Z direction in FIGS. 7 and 8) in the housing.

In the apparatus for protecting a sensor according to the second example embodiment, the second roller 32 may be supported by the cleaning liquid tank 60, which is described below.

The second roller 32 may be rotated by the driving force of the driving unit 40, and the second roller may wind the protective film 20 unwound from the first roller 31 to the outer circumferential surface thereof or may unwind the protective film from the outer circumferential surface. For winding of the protective film 20 by the second roller, the second end of the protective film may be coupled the second roller so as not to rotate relative to the second roller.

In another form, the driving unit 40 may include a motor or an actuator, which may rotate the second roller 32 forward and reverse at a predetermined angle. The driving unit may be directly connected to the rotation shaft of the second roller or may further include a transmission means such as a gear and may be indirectly connected to the rotation shaft of the second roller.

Here, the driving unit 40 may not only be installed in the second roller 32, and if desired, selectively, a driving unit may be provided in the first roller 31 and may rotate the first roller. In this case, the driving unit of the first roller may also work as the rotation prevention means 33.

Also, the driving force applied by the driving unit 40 to rotate the second roller 32 in the forward direction (e.g., counterclockwise in FIG. 10) may be set to exceed the rotation preventing force by force of the rotation prevention means 33 of the first roller 31, that is, the elastic force of the spring. Accordingly, when the second roller rotates in the forward direction by the driving unit, the first roller 31 connected by the protective film 20 may also rotate in the forward direction.

When the second roller 32 rotates in the reverse direction (e.g., clockwise in FIG. 10) by the driving unit 40, the first roller may also rotate in the reverse direction by the force of the rotation prevention means 33 of the first roller 31, that is, the elastic force of the spring.

The driving unit 40 may be connected to a power source outside the housing 10 by a wire (not illustrated) or may be connected to a battery disposed inside the housing and may be supplied with power.

Figure 10:
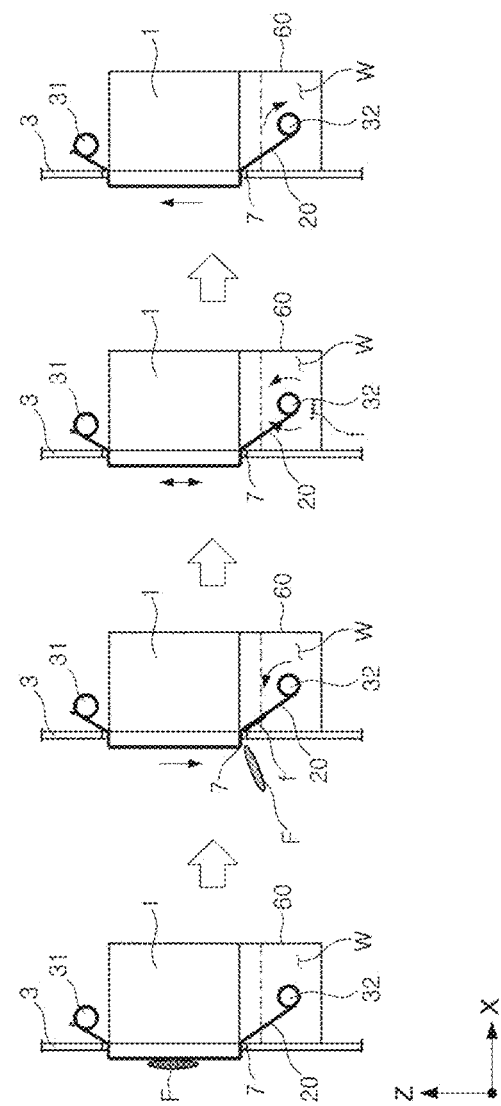
FIG. 10 is a diagram illustrating an operational state of an apparatus for protecting a sensor according to a second example embodiment of the present disclosure.

The apparatus for protecting a sensor according to the second example embodiment may include a cleaning liquid tank 60 accommodating the second roller 32 and the cleaning liquid W (see FIG. 10). In the cleaning liquid tank, the second roller may be immersed in the cleaning liquid and may rotate.

The cleaning liquid tank 60 may be a box-shaped member having an open upper surface, and may include a cover 61 for closing the upper surface. The cleaning liquid tank may be installed to be supported by the lower internal surface of the housing 10.

A second roller 32 may be installed in the cleaning liquid tank 60. For the installation of the second roller, a through-hole 62 to receive the rotation shaft of the second roller to rotate may be formed in left and right side surfaces of the cleaning liquid tank.

A sealing member such as a mechanical seal or a sealed bearing which may prevent leakage of a cleaning liquid and may support the rotation shaft of the second roller to rotate may be applied to the through-hole 62.

Since the second roller 32 is immersed in the cleaning liquid in the cleaning liquid tank 60, a portion of the protective film 20 wound on the second roller may also be immersed in the cleaning liquid and may be washed.

The driving unit 40 may be installed outside the cleaning liquid tank 60 and may be connected to the second roller 32 in the cleaning liquid tank through the through-hole 62.

In the apparatus for protecting a sensor according to the second example embodiment, since the second roller 32 is spaced apart from the first roller 31, the protective film 20 may be exposed by a spacing between the first roller and the second roller.

Further, when the opening 4 is formed in the installation object 3, at least a portion of the exposed surface of the protective film 20 may be exposed toward the outside of the installation object. In other words, the exposed surface of the protective film may be disposed between the sensing plane 2 of the sensor 1 and the opening of the installation object.

Also, the protective film 20 may be disposed between the sensor 1 and the guide member 7.

The housing 10 may be firmly fixed to the installation object 3 by the fastener 5, and simultaneously, the sensor 1 may be supported by the internal surface of the housing, and in particular, the protective film 20 may always be maintained with constant tension between the first roller 31 and the second roller 32 by the rotation prevention means 33, such that the exposed surface of the protective film may be flatly and securely in close contact with the sensor.

Accordingly, foreign objects may be prevented from entering between the exposed surface of the protective film 20 and the sensor 1.

When the exposed surface of the protective film 20 is contaminated by foreign objects, by rotating the second roller 32 alternately in the forward and reverse directions by the driving unit 40, the winding and unwinding of the protective film may be performed sequentially in the second roller, and the winding and unwinding of the protective film may also be performed sequentially in the first roller to corresponding to the winding and unwinding of the second roller.

During the reciprocating movement of the protective film, foreign objects having a relatively large size may be removed from the contaminated portion of the protective film 20 by the guide member 7.

Thereafter, the foreign objects having high viscosity and a relatively smaller thickness remaining in the contaminated portion of the protective film 20 may be washed by the cleaning liquid in the cleaning liquid tank 60. The washing action of the protective film may be performed in the cleaning liquid.

The apparatus for protecting a sensor according to the second example embodiment may further include a control unit 50 (see FIG. 4) for controlling the driving unit 40.

The control unit 50 may rotate the second roller 32 by operating the driving unit 40 every time the protective film 20 reaches a certain period (1 to 6 months) or a certain condition (when transparency deteriorates), thereby controlling the protective film to be washed by the cleaning liquid in the cleaning liquid tank 60.

To this end, the control unit 50 may include a timer 51 or may be electrically connected to the timer. Accordingly, when it is determined that a predetermined movement period has been reached, the control unit may control the operation of the driving unit 40.

For example, the control unit 50 may be electrically connected to the sensor 1 and the driving unit 40. Accordingly, when foreign objects are attached to the protective film 20, the control unit may recognize sensing abnormality of the sensor, or when the sensor is a camera, the control unit may analyze the image, may sense the transparency of the protective film and may simultaneously measure the degree of contamination, and may control the operation of the driving unit according to the result of the measurement.

Alternatively, the apparatus for protecting a sensor according to the second example embodiment may include a transparency sensor (not illustrated) disposed in the housing 10 and configured to sense transparency of the protection film 20, and the control unit 50 may be electrically connected to the transparency sensor and the driving unit 40.

As the transparency sensor, for example, an optical sensor, such as an infrared sensor, or a rain sensor may be employed. Substantially, the transparency sensor may sense the transparency of the protective film 20, and when it is determined that the transparency of the protective film deteriorates more than a reference value by a signal from the transparency sensor, the control unit 50 may control the operation of the driving unit 40.

Accordingly, the contaminated portion of the protective film 20 may be automatically immersed in the cleaning liquid in the cleaning liquid tank 60 and may be washed.

When the apparatus for protecting a sensor in the example embodiment is applied to a vehicle, the control unit 50 may be incorporated into or used in combination with an electronic control unit (ECU) of a vehicle, for example.

FIG. 10 is a diagram illustrating an operational state of an apparatus for protecting a sensor according to a second example embodiment. FIG. 10 is a side view in which a housing is omitted.

When the foreign object F is attached to the protective film, as described above, the control unit 50 may recognize sensing abnormality of the sensor 1, or when the sensor is a camera, the control unit 50 may analyzes the image, may sense the transparency of the protective film and may simultaneously measure the degree of contamination, and may control the operation of the driving unit 40.

Alternatively, the transparency sensor may sense the transparency of the protective film 20, and when it is determined that the transparency of the protective film deteriorates more than a reference value by a signal from the transparency sensor, the control unit 50 may control the operation of the driving unit 40.

The second roller 32 may rotate in the forward direction (e.g., counterclockwise in FIG. 10) by the driving force of the driving unit 40, and the first roller 31 connected by the protective film 20 may also rotate in the forward direction. The second roller may wind the protective film unwound from the first roller to the outer circumferential surface thereof according to the rotation thereof.

In this case, the foreign object F may also move together according to the movement of the protective film 20, and the foreign object may gradually approach an edge of one side forming the opening 4 of the installation object 3. A relatively large foreign object F may be removed from the protective film 20 by the guide member 7 disposed on the edge of the opening.

Although the foreign object F is removed from the protective film 20, traces or still contaminated portions may be wound on the outer circumferential surface of the second roller 32. The winding of the protective film may continue such that the contaminated portion may be sufficiently immersed in the cleaning liquid W in the cleaning liquid tank 60.

Accordingly, the foreign objects f having high viscosity and a relatively smaller size or thickness remaining in the contaminated portion of the protective film 20 may be washed by the cleaning liquid in the cleaning liquid tank 60 for a short time.

During the washing, a clean portion of the protective film 20 unwound from the first roller 31 may spread to correspond to the sensing plane 2 of the sensor 1 and may form an exposed surface.

Thereafter, the second roller 32 may rotate in the reverse direction (e.g., clockwise in FIG. 10) by the driving unit 40. As the second roller rotates in the reverse direction, the protective film 20 may be unwound again from the second roller, and the first roller 31 may also rotate in the reverse direction by force of the rotation prevention means 33, that is, the elastic force of the spring. The first roller may wind the protective film unwound from the second roller to the outer circumferential surface thereof according to the rotation.

By performing the process at least once or more, the washed and cleaned portion of the protective film 20 may be released from the second roller 32 in the cleaning liquid W, may spread to correspond to the sensing plane 2 of the sensor 1 and may form the exposed surface.

Accordingly, the sensor 1 may continuously perform accurate sensing through the protective film 20.

As described above, since the apparatus for protecting a sensor according to the second example embodiment is configured to perform the washing of the protective film, the sensor and components may be protected, and it may not be necessary to periodically supply a cleaning liquid, and the protective film may be used semi-permanently.

According to the apparatus for protecting a sensor according to the second example embodiment, the sensor may be protected, foreign objects may be prevented from adhering to the sensing plane of the sensor, and the sensor may continuously and accurately sense through the protection film.

Also, according to the apparatus for protecting a sensor according to the second example embodiment, a pump for spraying air or water, a connection pipe, a wiper for wiping, and the like, may not be used such that the apparatus may be configured compactly. Accordingly, there may be an effect in which costs may be reduced, and that the space required for the installation object such as a vehicle may be significantly reduced.

Also, according to the apparatus for protecting a sensor according to the second example embodiment, a two-step system in which a large-sized foreign object may be removed by the guide member and a small-sized foreign object having large viscosity may be washed using a cleaning liquid may be applied, such that the effect of reliably removing foreign object within the short period of time may be obtained.

While the example embodiments have been illustrated and described above, it should be apparent to those having ordinary skill in the art that modifications and variations could be made without departing from the scope in the example embodiment.

What is claimed is:

1. An apparatus for protecting a sensor, the apparatus comprising:
    a housing configured to accommodate the sensor and mounted on an installation object, wherein the sensor includes a sensing plane to be exposed to outside of the housing;
    a protective film disposed over the sensing plane of the sensor and having a band shape to be wound; and
    a moving unit installed in the housing and configured to move the protective film while maintaining a position of the protective film with respect to the sensing plane of the sensor,
    wherein the moving unit includes:
        a first roller configured to wind the protective film and installed in the housing;
        a second roller spaced apart from the first roller, disposed in the housing, and configured to wind the protective film unwound from the first roller; and
        a driver configured to generate a driving force for rotating the second roller.

2. The apparatus of claim 1,
    wherein the protective film is formed of a transparent material such that the sensor is able to perform sensing while the sensing plane of the sensor is covered.

3. The apparatus of claim 1,
    wherein the protective film is provided in the form of a cartridge including a first bobbin and a second bobbin,
    wherein a first end of the protective film is fixed to the first bobbin and the protective film is wound on the first bobbin, and a second end of the protective film is fixed to the second bobbin,
    wherein the first bobbin is installed to be fitted to the first roller to rotate with the first roller, and
    wherein the second bobbin is installed to be fitted to the second roller to rotate with the second roller.

4. The apparatus of claim 3,
    wherein the housing is configured to be divided into a first housing unit and a second housing unit, and
    wherein the protective film is separated from the housing and is replaceable.

5. The apparatus of claim 1, further comprising:
    a rotation prevention means configured to prevent rotation of the first roller.

6. The apparatus of claim 5,
    wherein the rotation prevention means includes a spring.

7. The apparatus of claim 5,
    wherein the driving force applied by the driver and rotating the second roller is set to exceed a rotation preventing force of the rotation prevention means.

8. The apparatus of claim 1, further comprising:
    a controller electrically connected to the driver and configured to control the driver,
    wherein the controller is electrically connected to the sensor.

9. The apparatus of claim 8,
    wherein the controller is configured to sense transparency of the protective film by the sensor and control operations of the driver according to the sensed transparency of the protective film.

10. The apparatus of claim 8, further comprising:
    a transparency sensor disposed in the housing and configured to sense transparency of the protective film,
    wherein the controller is electrically connected to the transparency sensor.

11. The apparatus of claim 8, further comprising:
    a thickness sensor disposed in the housing, wherein when the protective film is wound around the second roller, the thickness sensor is configured to sense a laminated thickness of the protective film,
    wherein the controller is electrically connected to the thickness sensor and a warning unit.

12. The apparatus of claim 8,
    wherein the controller includes a timer or is electrically connected to the timer.

13. The apparatus of claim 1, further comprising:
    a cleaning liquid tank supported by the housing and configured to accommodate the second roller and a cleaning liquid, wherein, in the cleaning liquid tank, the second roller is immersed in the cleaning liquid and is rotatable.

14. The apparatus of claim 13,
wherein a through-hole for supporting a rotation shaft of the second roller to rotate is formed in the cleaning liquid tank, and
wherein the driver is installed externally of the cleaning liquid tank and is connected to the second roller through the through-hole.

15. The apparatus of claim 13,
wherein the protective film has a first end fixed to the first roller and is wound on or unwound from the first roller, and the protective film has a second end fixed to the second roller and is wound on or unwound from the second roller, and
wherein the driver is able to perform forward and reverse rotation.

16. The apparatus of claim 15,
wherein, when the second roller rotates in a forward direction by the driver, the protective film unwound from the first roller is wound on an outer circumferential surface of the second roller and is immersed in the cleaning liquid in the cleaning liquid tank, and
wherein, when the second roller rotates in a reverse direction by the driver, the protective film unwound from the second roller is wound on an outer circumferential surface of the first roller, and a washed portion of the protective film is disposed over the sensing plane of the sensor.

17. An apparatus for protecting a sensor, the apparatus comprising:
   a housing configured to accommodate the sensor and mounted on an installation object, wherein the sensor includes a sensing plane to be exposed to outside of the housing;
   a protective film disposed over the sensing plane of the sensor;
   a moving unit having a first roller and a second roller installed to be spaced apart from each other in the housing, and configured to move the protective film while maintaining a position of the protective film with respect to the sensing plane of the sensor; and
   a guide rod installed in an opening of the installation object and configured to press the protective film to be bent, and remove foreign objects when the protective film moves.

18. The apparatus of claim 17, wherein the guide rod has a polygonal cross-sectional surface.

* * * * *

UNITED STATES PATENT AND TRADEMARK OFFICE
CERTIFICATE OF CORRECTION

| | | |
|---|---|---|
| PATENT NO. | : 12,251,737 B2 | Page 1 of 1 |
| APPLICATION NO. | : 17/683063 | |
| DATED | : March 18, 2025 | |
| INVENTOR(S) | : Eun Sik Kim | |

It is certified that error appears in the above-identified patent and that said Letters Patent is hereby corrected as shown below:

On the Title Page

Item (30) Foreign Application Priority Data should read:
October 20, 2021 (KR) ................10-2021-0140415

Signed and Sealed this
Fifteenth Day of April, 2025

Coke Morgan Stewart
*Acting Director of the United States Patent and Trademark Office*